(12) United States Patent
Gillespie et al.

(10) Patent No.: US 7,738,360 B2
(45) Date of Patent: Jun. 15, 2010

(54) METHOD AND APPARATUS FOR MERGING CALL COMPONENTS DURING CALL RECONSTRUCTION

(75) Inventors: Donald E. Gillespie, Boulder, CO (US); Manish Marwah, Boulder, CO (US); Vivekananda Velamala, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 221 days.

(21) Appl. No.: 11/927,164

(22) Filed: Oct. 29, 2007

(65) Prior Publication Data

US 2008/0049770 A1    Feb. 28, 2008

Related U.S. Application Data

(62) Division of application No. 11/045,702, filed on Jan. 27, 2005, now Pat. No. 7,366,110.

(60) Provisional application No. 60/615,295, filed on Sep. 30, 2004.

(51) Int. Cl.
*H04L 12/28* (2006.01)

(52) U.S. Cl. ............... 370/216; 370/389; 370/400; 709/220; 709/223

(58) Field of Classification Search ............... None
See application file for complete search history.

(56) References Cited

U.S. PATENT DOCUMENTS

| | | |
|---|---|---|
| 5,206,903 A | 4/1993 | Kohler et al. |
| 5,280,561 A | 1/1994 | Satoh et al. |
| 5,442,696 A | 8/1995 | Lindberg et al. |
| 5,828,747 A | 10/1998 | Fisher et al. |
| 5,905,793 A | 5/1999 | Flockhart et al. |
| 5,974,114 A | 10/1999 | Blum et al. |

(Continued)

FOREIGN PATENT DOCUMENTS

EP    0805576 A2    11/1997

(Continued)

OTHER PUBLICATIONS

Handley et al., RFC 2327, Apr. 1998, 1-43.*

(Continued)

*Primary Examiner*—Ayaz R Sheikh
*Assistant Examiner*—Nicholas Sloms
(74) *Attorney, Agent, or Firm*—Sheridan Ross P.C.

(57) ABSTRACT

The present invention is directed to a secondary communication server 216 for assuming control of a communication formerly controlled by a primary communication server 212 in the event of a failure, comprising:

(a) an input operable to (i) receive, from a first communication node 204a, first communication information, wherein the first communication information is associated with the communication and comprises a first node identifier 236a and/or a communication identifier 240a, the first node identifier 236a is associated with a second communication node 204b, the communication identifier is associated with the communication, and the second communication node 204b comprises second communication information associated with the communication and (ii) thereafter receive, from the second communication node 204b, the second communication information; and (b) a reconstruction agent 228 operable to identify the second communication information based on the first node identifier 236a and/or communication identifier 240a.

20 Claims, 4 Drawing Sheets

U.S. PATENT DOCUMENTS

| | | | |
|---|---|---|---|
| 5,982,873 | A | 11/1999 | Flockhart et al. |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,282,192 | B1 | 8/2001 | Murphy et al. |
| 6,292,463 | B1 | 9/2001 | Burns et al. |
| 6,314,114 | B1 | 11/2001 | Coyle et al. |
| 6,411,705 | B2 | 6/2002 | Oran et al. |
| 6,434,226 | B1 | 8/2002 | Takahashi |
| 6,504,922 | B1 | 1/2003 | Erb |
| 6,574,469 | B1 | 6/2003 | Xiang et al. |
| 6,661,785 | B1 | 12/2003 | Zhang et al. |
| 6,665,375 | B1 | 12/2003 | Forlenza et al. |
| 6,671,262 | B1 | 12/2003 | Kung et al. |
| 6,721,712 | B1 | 4/2004 | Benyassine et al. |
| 6,731,734 | B1 | 5/2004 | Shaffer et al. |
| 6,738,343 | B1 | 5/2004 | Shaffer et al. |
| 6,801,612 | B2 | 10/2004 | Malcolm et al. |
| 6,925,076 | B1 | 8/2005 | Dalgic et al. |
| 6,937,873 | B2 | 8/2005 | Levy et al. |
| 6,950,874 | B2 | 9/2005 | Chang et al. |
| 6,968,382 | B2 | 11/2005 | McBrearty et al. |
| 6,973,506 | B2 | 12/2005 | Ishiyama et al. |
| 6,999,478 | B2 | 2/2006 | D'Angelo |
| 7,042,871 | B2 | 5/2006 | Gallant et al. |
| 7,145,900 | B2 | 12/2006 | Nix et al. |
| 7,161,897 | B1 | 1/2007 | Davies et al. |
| 7,215,643 | B2 | 5/2007 | Mussman et al. |
| 7,227,927 | B1 | 6/2007 | Benedyk et al. |
| 7,243,142 | B2 | 7/2007 | Poirot et al. |
| 7,243,365 | B1 * | 7/2007 | Rahman ............... 725/109 |
| 7,366,110 | B2 | 4/2008 | Gillespie et al. |
| 2003/0031137 | A1 | 2/2003 | Tomas |
| 2003/0086559 | A1 | 5/2003 | Chen et al. |
| 2003/0091024 | A1 | 5/2003 | Stumer |
| 2003/0202462 | A1 | 10/2003 | Smith et al. |
| 2004/0028199 | A1 | 2/2004 | Carlson |
| 2004/0032862 | A1 | 2/2004 | Schoeneberger et al. |
| 2004/0101119 | A1 | 5/2004 | Malcolm et al. |
| 2004/0143665 | A1 | 7/2004 | Mace et al. |
| 2004/0252676 | A1 | 12/2004 | Bye |
| 2005/0021849 | A1 | 1/2005 | Hipfinger |
| 2005/0068889 | A1 | 3/2005 | Chavez et al. |
| 2005/0094582 | A1 * | 5/2005 | Forissier et al. ............ 370/261 |
| 2005/0281216 | A1 | 12/2005 | Varonen et al. |
| 2006/0034297 | A1 | 2/2006 | O'Neill |
| 2006/0092919 | A1 | 5/2006 | Hallmark et al. |
| 2006/0146737 | A1 | 7/2006 | Sandgren et al. |
| 2006/0146799 | A1 | 7/2006 | Baldwin et al. |
| 2006/0146802 | A1 | 7/2006 | Baldwin |
| 2006/0146859 | A1 | 7/2006 | Baldwin et al. |
| 2006/0168326 | A1 | 7/2006 | Baldwin et al. |

FOREIGN PATENT DOCUMENTS

| | | | |
|---|---|---|---|
| EP | 0920176 | A2 | 6/1999 |
| EP | 0964563 | | 12/1999 |
| EP | 1091550 | | 4/2001 |
| EP | 1250023 | A1 | 10/2002 |
| EP | 1677569 | A1 | 7/2006 |
| EP | 1677570 | A1 | 7/2006 |
| JP | S58-170272 | | 10/1983 |
| JP | H04-245793 | | 9/1992 |
| JP | H06-86338 | | 3/1994 |
| JP | 08-065340 | | 3/1996 |
| JP | H8-320800 | | 12/1996 |
| JP | H10-164240 | | 6/1998 |
| JP | 10-224408 | | 8/1998 |
| JP | H10-214240 | | 8/1998 |
| JP | H11-331153 | | 11/1999 |
| JP | 2000-174824 | | 6/2000 |
| JP | 2000-174825 | | 6/2000 |
| JP | 2001-156786 | | 6/2001 |
| JP | 2001-186165 | | 7/2001 |
| JP | 2001-196165 | | 7/2001 |
| JP | 2002-522962 | | 7/2002 |
| JP | 2002-237896 | | 8/2002 |
| JP | 2002-247187 | | 8/2002 |
| JP | 2002-305588 | | 10/2002 |
| JP | 2003-101669 | | 4/2003 |
| JP | 2003-514439 | | 4/2003 |
| JP | 2003-244204 | | 8/2003 |
| JP | 2004-186766 | | 7/2004 |
| JP | 2005-39565 | | 2/2005 |
| JP | 2005-512397 | | 4/2005 |
| WO | WO 00/72536 | | 11/2000 |
| WO | WO 00/72560 | A1 | 11/2000 |
| WO | WO 01/65808 | | 9/2001 |
| WO | WO 01/69858 | | 9/2001 |

OTHER PUBLICATIONS

U.S. Appl. No. 11/231,203, filed Sep. 19, 2005, Baldwin.

Examiner's Office Letter (including translation) for Japanese Patent Application No. 2005-206407, mailed Feb. 27, 2008 (Attorney's Ref. No. 4366-204-JP).

Background of the Invention for the above-captioned application (previously provided).

U.S. Appl. No. 11/080,763, filed Mar. 14, 2005, Coughlan et al.

M. Bozinovski et al., "Fault-tolerant SIP-based call control system," Electronics Letters, vol. 39, No. 2 (Jan. 23, 2003), pp. 254-256, XP006019695 ISSN: 0013-5194.

ITU-T Recommendation H.248, "Series H: Audiovisual and Multimedia Systems," International Telecommunication Union (Jun. 2000), pp. 1-121.

Kristol and Montulli, "HTTP State Management Mechanism," Oct. 2000, pp. 1-22, available at http://www.cse.ohio-state.edu/cgi-bin/rfc/rfc2965.html, printed Feb. 3, 2005.

European Examination Report for EP Application No. 04255375.0 (Jun. 28, 2006).

EP Examination Report for EP Application No. 05254997.9 (Nov. 3, 2006) 3 pages.

Extended European Search Report for EP Application No. 05254997.9 (Feb. 16, 2006) 6 pages.

Clark, William J.; "Multipoint Multimedia Conferencing"; IEEE Communications Magazine; May 1992; pp. 44-50.

Cisco Systems Overview-Cisco IOS Telephony Services: Survival Remote Site Telephony, "Now Cost-Effectively Extend Cisco CallManager IP Telephony . . . ", 2001, pp. 1-14.

Cisco Systems Solutions Guide—"Survivable Remote Site Telephony Cisco 2600/3600 Voice Technical Marketing" Copyright 1992-2001, Cisco Systems, Inc., pp. 1-19.

Cisco Systems IOS Release 12.2(8)T—Survivable Remote Site Telephony, pp. 1-74 (undated).

Cisco Solutions Guide—"Survivable Remote Site Telephony Cisco 2600/3600 Voice Technical Marketing" Copyright 1992-2001, Cisco Systems, Inc., 21 pages.

Cisco Systems—Survivable Remote Site IP Telephony, Copyright 1992-2003, Cisco Systems, Inc., http://www.cisco.com/warp/public/cc/pd/unco/srstl, 1 page.

Cisco Systems White Paper—"Ensuring IP Telephony High Availability in the Branch Office . . . " Copyright 1992-2005, 5 pages.

Cisco LP Telephony Solution Reference Network Design, Dial Plan, #9562230403, Chapter 8, pp. 1-70 (undated).

Lucent Technologies Merlin Legend Communications System, Release 6.1, Network Reference, 555-661-150 Comcode 108289703; Issue 1, Aug. 1998; 369 pages.

"Separation of Bearer and Signaling for Avaya™ Communication Manager," Avaya, Issue 1 (May 2003) pp. 1-42.

Carroll Communications, Inc. Automatic Route Selection (ARS) Feature, at http://wvvw.carrollcommunications.com/merlinmagix/AutomaticRouteSelection.html, 2 pages.

KXTD System—ISDN—Basic and Primary Rate Interfaces, at http://www.thetelephoneexchange.co.uk/Teleweb_files/kxtd.html, 5 pages.

Definition—automatic route selection (ARS) at http://www.atisorg/tg2k/automatic_selection_route.html, 1 page.

Acronym Finder—ARS at http://www.auditmypc.com/acronym/ARS.asp, 2 pages.

WestNet Learning—glossary for UDP, at http://glossary.westnet.com/term.php?termId=2213, 1 page.

Declaration of Michael Gruen Under 37 CFR Section 1.98; 3 pages.

Examiner's Refusal Decision (including translation) for Japanese Patent Application No. 2005-206407, mailed Sep. 29, 2008 (Attorney's Ref. No. 4366-204-JP).

* cited by examiner

METHOD AND APPARATUS FOR MERGING CALL COMPONENTS DURING CALL RECONSTRUCTION

CROSS REFERENCE TO RELATED APPLICATION

This application claims the benefits under 35 U.S.C. §119 of U.S. Provisional Patent Application Ser. No. 60/615,295, filed Sep. 30, 2004, of the same title and to the same inventors, which is incorporated herein by this reference.

Cross reference is made to U.S. patent application Ser. No. 10/676,659, filed Sep. 30, 2003, entitled "METHOD AND APPARATUS FOR MIGRATING TO AN ALTERNATE CALL CONTROLLER", which is incorporated herein by this reference.

FIELD OF THE INVENTION

The present invention is directed to realtime data transmission over a network. In particular, the present invention is directed to maintaining call state information when migrating between call controllers.

BACKGROUND OF THE INVENTION

Packet data networks are increasingly used for the exchange of realtime audio, video and data communications. Various protocols, including the H.323 protocol, require the establishment of a call signaling channel that is separate from the bearer channel. The call signaling channel is used to exchange signaling messages, such as call setup, tear down, address translation and messages related to billing.

With reference to FIG. 1 in connection with realtime communications over packet data networks, or IP telephony, a signaling channel is usually established over the IP network 100 between a media gateway 104 and/or communication device 108 on the one hand and a primary communication server 112, providing call controller functionality for basic call service and for various call feature support, on the other. Failure of the network 100 (or a link in the network) or the primary server 112 such that the call signaling channel is lost can lead to a service outage at the media gateway 104 or communication device 108. In order to prevent a loss of service under such circumstances, an alternate or secondary communication server 116 is typically provided. However, when a media gateway 104 or communication device 108 migrates to the secondary communication server 116, the existing calls (i.e., the bearer channels) may get torn down. Even if they are not torn down, it is likely that no call features will be available to the media gateway 104 or communication device 108, since the secondary communication server 116 has no knowledge of the call state information associated with the calls. In particular, preservation of call features in addition to bearer connections requires that the secondary communication server 116 be supplied with call state information.

To provide call state information to a secondary communication server 116, such information can be stored in a database that can be accessed by all primary and secondary servers. However, establishing a common, redundant database can be expensive. In addition, such databases can create a data bottleneck, especially when a large number of servers are accessing the database. Furthermore, such a solution is not very robust, as network failures can prevent call controllers from accessing the common database.

Another approach to providing call state information to secondary communication servers 116 dynamically updates available secondary communication servers 116 with call state information. That is, as call state information is generated or updated, that information is provided to the secondary communication server 116 that would be contacted by the client if the primary communication server 112 were lost. However, this approach adds overhead and complexity, particularly as the number of communication servers available on a system increases. In addition, the secondary communication servers 116 must be updated with call state information regarding all of the calls on the primary communication server 112. This can result in network congestion. In addition, the solution is not very robust, as network failures can prevent servers from communicating with one another.

In yet another approach, the components of the calls are not merged; in other words, they are reconstructed as separate calls. The separate calls, however, would not behave the same with respect to some features as the original or a merged call. For example, it is possible that a component separately reconstructed as a call has no disconnect supervision.

In yet another approach, the secondary communication server 116 attempts to reconstruct stable calls (calls with established talk paths) on the gateway 104 by querying the gateway 104 for call state information. The call state information was saved by the primary communication server 112 when it originally created the call on the gateway 104. However, where a call spans multiple gateways (or includes one or more inter-gateway connections (which commonly is an IP-bearer connection between two gateways on a common or shared primary communication server)), such as a call between communication devices 108a and b (which spans gateways 104a and b), a naive call reconstruction algorithm would, as the call components migrate, reconstruct the part of the call handled by each gateway as a separate or new call, which, as noted above, can cause some features to be lost to the communicants.

SUMMARY OF THE INVENTION

These and other needs are addressed by the various embodiments and configurations of the present invention. The present invention is directed to communication reconstruction during transition from a primary to a secondary communication server by maintaining communication state information or a representation thereof on a communication node, such as a media gateway or communication terminal. As used herein, communication state information refers to communication-related information, such as call set-up information, tear down, address translation, call appearances for each party, feature selections, and billing information and "communication" refers to packet-switched and/or circuit-switched, analog and/or digital real-time or near-real-time communication signals between two or more parties.

In one configuration that is particularly useful for communication nodes that are gateways, the communication information maintained on a first communication node comprises a communication identifier and/or node identifier. The communication identifier identifies a selected communication uniquely among a defined group of communications. The node identifier identifies a second communication node, which is also involved in the selected communication, and/or communication state information on the second node uniquely among a defined group of communication nodes and/or call controllers. The identifier(s) are selected so as to be unique across reboots of the same call controller. For example, the communication identifier and/or node identifier can be stored on the first communication node as part of the context of the selected communication (or as a property of a termination), and the node can include both a resource identifier, such as an resource identifier, and a local identifier, which represents an association between terminations in a connection such as an resource identifier. The resource and local identifiers are both associated with the second communication node. Typically, the identifier(s) are used for reconstructing communications that involve one or more inter-gateway connections. As noted, an inter-gateway connection is an IP-bearer connection established between two or more gateways to connect two or more parts of a communication.

The present invention can effect efficient and rapid matching of the various components of a communication in the event of a failure requiring transition from the primary to the secondary communication controller. It merges the communication components and therefore the reconstructed communication is identical to the original communication in terms of the number of parties in the call, features related to the structure of the communication, and the like. The identifier(s) can be relatively low bit numeric, alphabetical, or alphanumeric sequences, thereby requiring fewer resources to store and manage and may be used as an index to an array.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
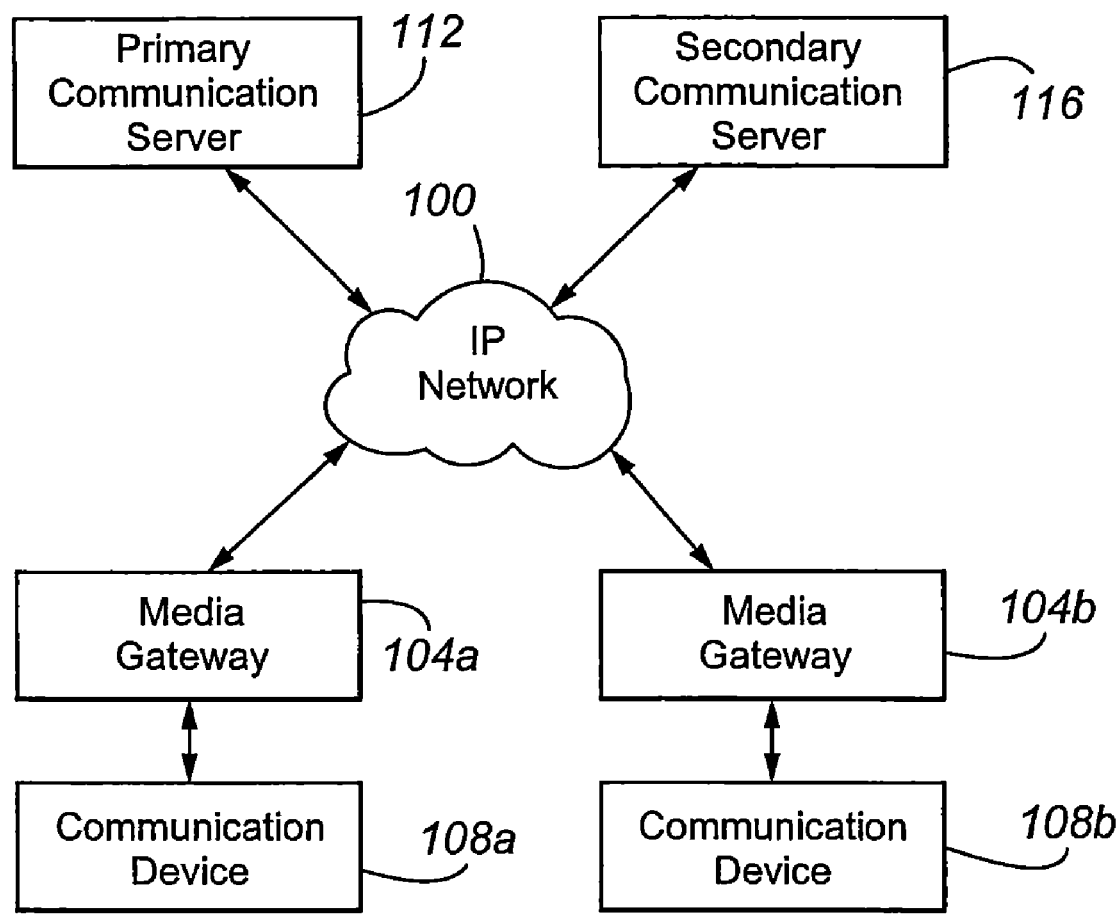
FIG. 1 is a block diagram depicting a prior art communications network.
Figure 2:
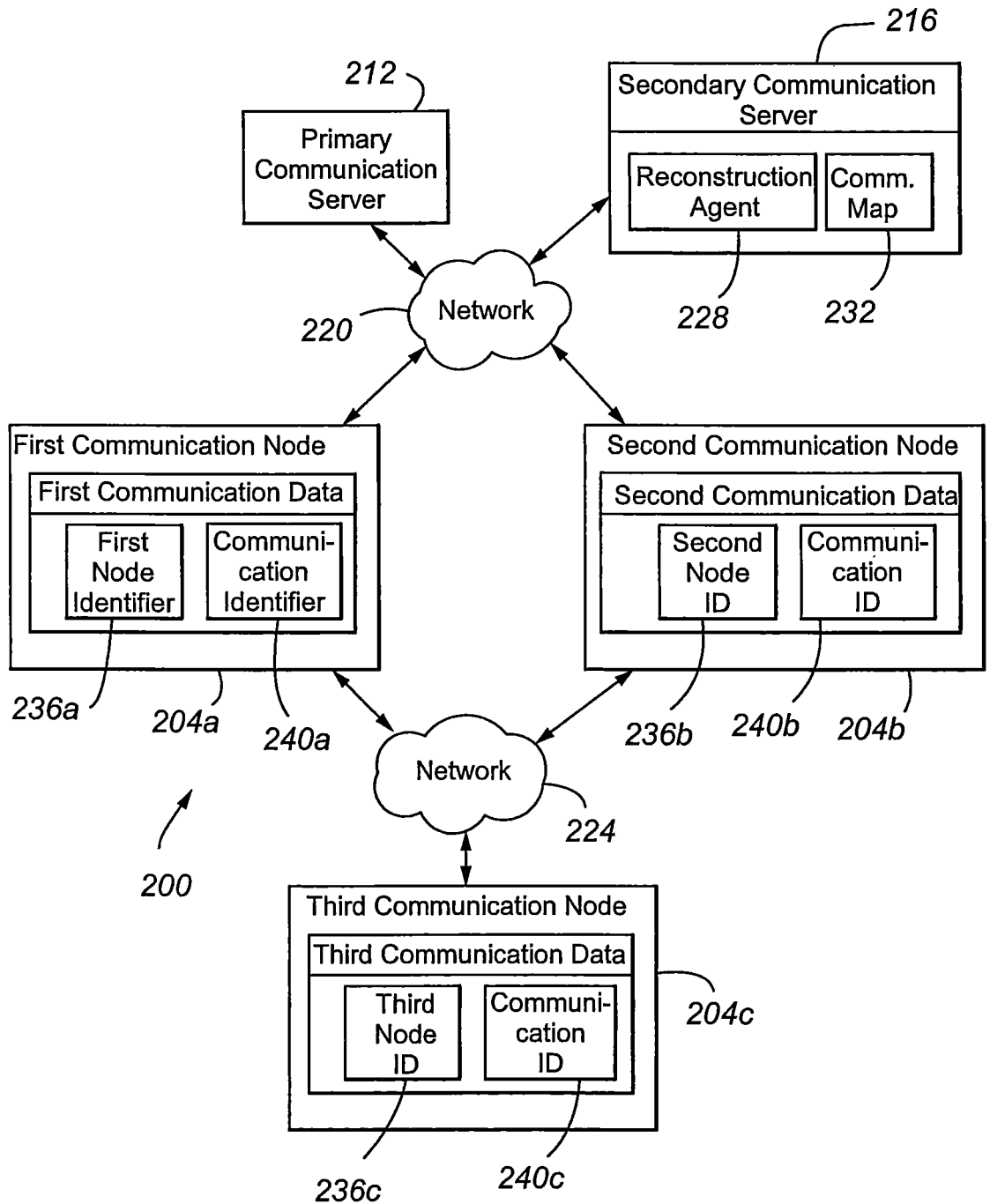
FIG. 2 is a block diagram depicting a communications network according to an embodiment of the present invention.

With reference now to FIG. 2, a realtime or near realtime communication arrangement 200 in accordance with an embodiment of the present invention is illustrated. In general, the communication arrangement 200 involves a number of communication nodes 204*a-c* interconnected to one another by communication networks 220 and 224. The communication nodes are further in communication, via the networks 220 and 224, with a primary and secondary communication servers 212 and 216.

The communication nodes 204*a-c* can be any terminating or intermediate node. For example, the nodes can represent one or more of a gateway, port network, center stage switch, and a communication terminal, such as a wired or wireless circuit-switched or packet-switched telephone (e.g., an IP soft phone or hard phone, a Digital Signal Processor or DSP telephone, a video phone, a Personal Digital Assistant, a computer running an instant messaging application, and the like). In a preferred embodiment, the first, second, and third communication nodes 204*a-c* are gateways, particularly the G700™ or G350™ media gateways by Avaya Inc. modified as hereinafter described. As will be appreciated, a gateway provides for an interconnection between a communication endpoint (or to a non-IP protocol network) that is not capable of direct interconnection to the IP protocol communication network.

The networks 220 and 224 can be synchronous and/or asynchronous transfer mode, connection-oriented and/or connectionless, and circuit and/or packet-switched. The networks can be the Public Switched Telephone Network (PSTN), wireless cellular networks, Wide Area Networks, (WANs), Metropolitan Area Networks (MANs), Regional Area Networks (RANs) or Local Area Networks (LANs), depending on the application.

The primary and secondary communication servers 212 and 216 function to facilitate or enable communications between the first, second, and third nodes 204 of the communication networks 220 and 224. For example, the communication servers control media gateways during call set-up and termination and maintain communication-related information, such as call state information. Examples of call state information include Session Initiation Protocol (SIP), H.248, and/or H.323 communication information generated in connection with real-time or near real-time communications over an IP protocol communication network. By way of illustration, communication information may include static and dynamic call-state information, such as calling and called party identities, call setup, tear down, address translation, call appearances for each party, feature selections, and billing information. As will be appreciated, in the H.248 standard the communication information is saved as properties of the termination of a corresponding communication, and the "context" refers to a particular node's data representation of a communication, such as a group of (physical and/or ephemeral) terminations which are associated together in a communication. The servers 212 and 216 also function to control access to the communication networks. In a preferred embodiment, the primary and secondary communication servers are software-controlled, and the call control functionality is provided by a modified version of Communication Manager™ by Avaya Inc.

The secondary communication server 216 includes a reconstruction agent 228 to reconstruct communications, during communication node transition from the primary to the secondary communication servers, by populating a communication map 232 that replicates the call state information on the primary communications server 212. As will be appreciated, a media gateway is in transition from the time it detects failure of its signaling link to the primary communication server to the time it regains connectivity to the primary or secondary communications server). The primary and secondary communication servers commonly have identical copies of the static data but the primary server and not the secondary communication server has the call status information. During node transition from the primary to the secondary server, the call state or status information must be reconstructed by the secondary server.

To facilitate communication reconstruction, each of the communication nodes 204*a-c* maintains in memory a corresponding node identifier 236*a-c* and a communication identifier 240*a-c*. In connection with a communication between the host node and a distant node, the node identifier 236*a-c* identifies uniquely the distant node and/or a component thereof and/or the distant node's communication information relative to a selected group of network components. The node identifier is commonly unique within a group of network nodes and/or primary communication and secondary servers. More typically, it is unique among a group of network components controlled by the primary communication server and/or within the set of nodes that fail over to the secondary communication server. The group of network components is typically part of an enterprise network. The communication identifier uniquely identifies a communication uniquely relative to a set of other communications handled by a group of network nodes and/or primary and secondary communication servers. Typically, the set of other communications is handled by one or more of the group of network components controlled by the primary communication server and/or the set of nodes that fail over to the secondary communication server. Thus, the node identifier will typically be different from node-to-node (so that the first, second, and third identifiers are each different from one another), and the communication identifier is the same for each node involved in the selected communication.

In one configuration, the node identifier is one or more of an electronic address (e.g., a Media Access Control or MAC address or an Internet Protocol address) of a node or a network endpoint involved in a specific communication, an identifier of a data structure (e.g., a pointer), such as a communication context, related to or used by the communication, an identifier of one or more resources (e.g., port, port network, DSP, DSP channel, set of one or more tones, tone detector, set of one or more announcements, and the like) in the node involved in the communication, and combinations thereof. In a preferred configuration, the node identifier has two components, namely a resource identifier and a local identifier, that are each associated with a far end-node that is connected as part of the same communication to a selected node. With reference to FIG. 2, for example, the first node identifier could be a unique identifier associated with the second and/or third communication node; the second node identifier a unique identifier associated with the first and/or third node; and so forth. In one configuration, the local identifier refers to a unique identifier of context information stored in a far end-node that is connected as part of the same communication to a selected node. Within the H.248 standard, for example, the resource identifier is an identifier (such as an electronic address) of a node, such as a gateway, and/or a resource on the node that is at the far end of an inter-node connection, such as an inter-gateway connection, and the local identifier identifies the context stored in the node identified by the resource identifier. As will be appreciated, a resource can refer to a gateway or a resource thereof, such as a port, DSP channel, set of one or more tones, tone detector, set of one or more announcements, and the like, used by the selected communication at the far end node. The resource and local identifiers are commonly saved in a selected node as a property (each of which includes a property name and value) of the ephemeral termination corresponding to the selected communication being handled by the selected node.

The communication identifier is any identifier generated as part of the communication and/or generated in addition to the communication. For example, the identifier can be a session identifier, a session key, or a random variable generated specifically for the purpose of acting as the communication identifier.

The node and/or communication identifiers are pushed, as properties of the termination, to the communication nodes by the primary communication server 212 during normal operations. For example, the identifiers can be specified in the H.248 add/subtract/modify/move messages. Thus, the identifiers can be included in messages currently being exchanged between the primary communication server and the node.

The operation of the reconstruction agent 228 will now be described with reference to FIGS. 2-4.

Figure 3:
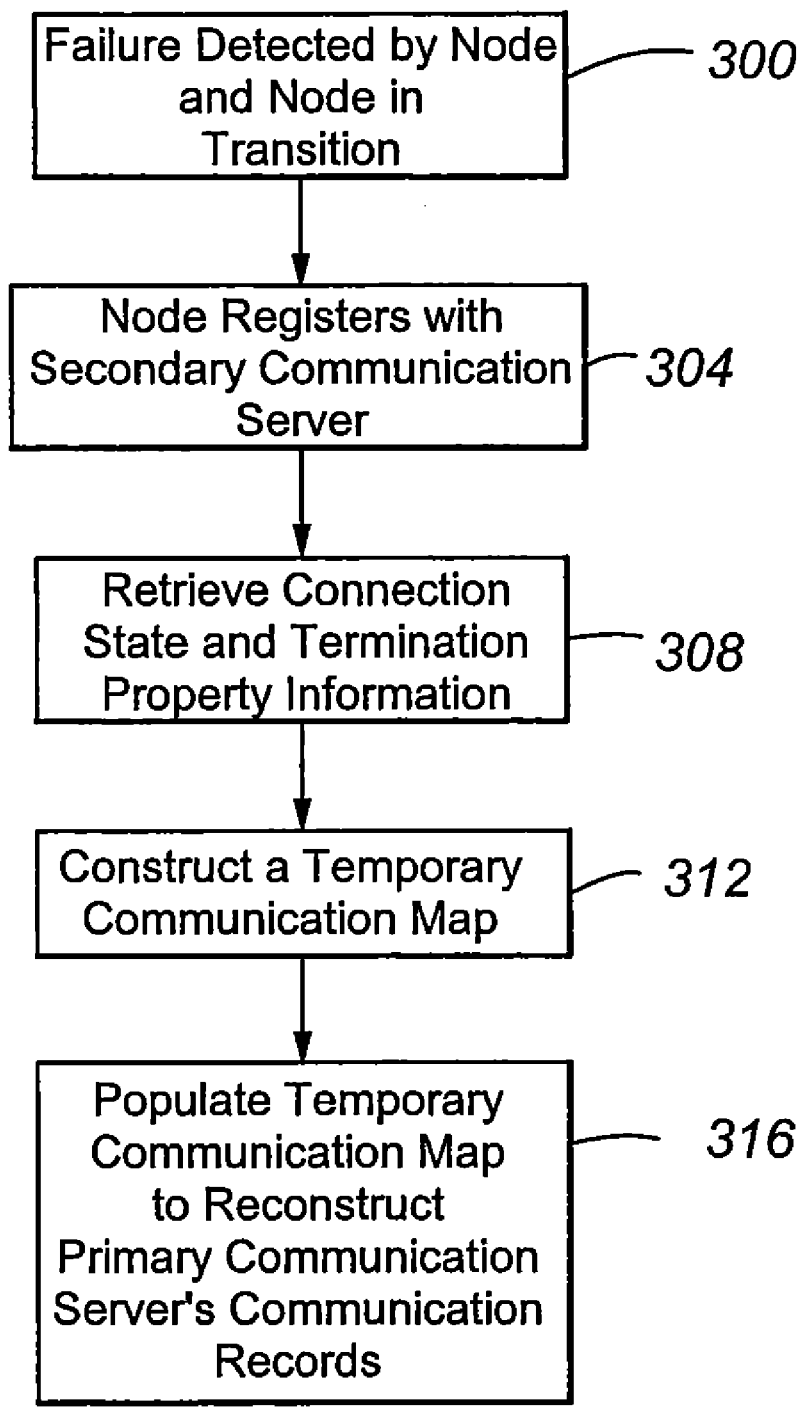
FIG. 3 is a flowchart depicting a communication reconstruction algorithm according to an embodiment of the present invention.
Figure 4:
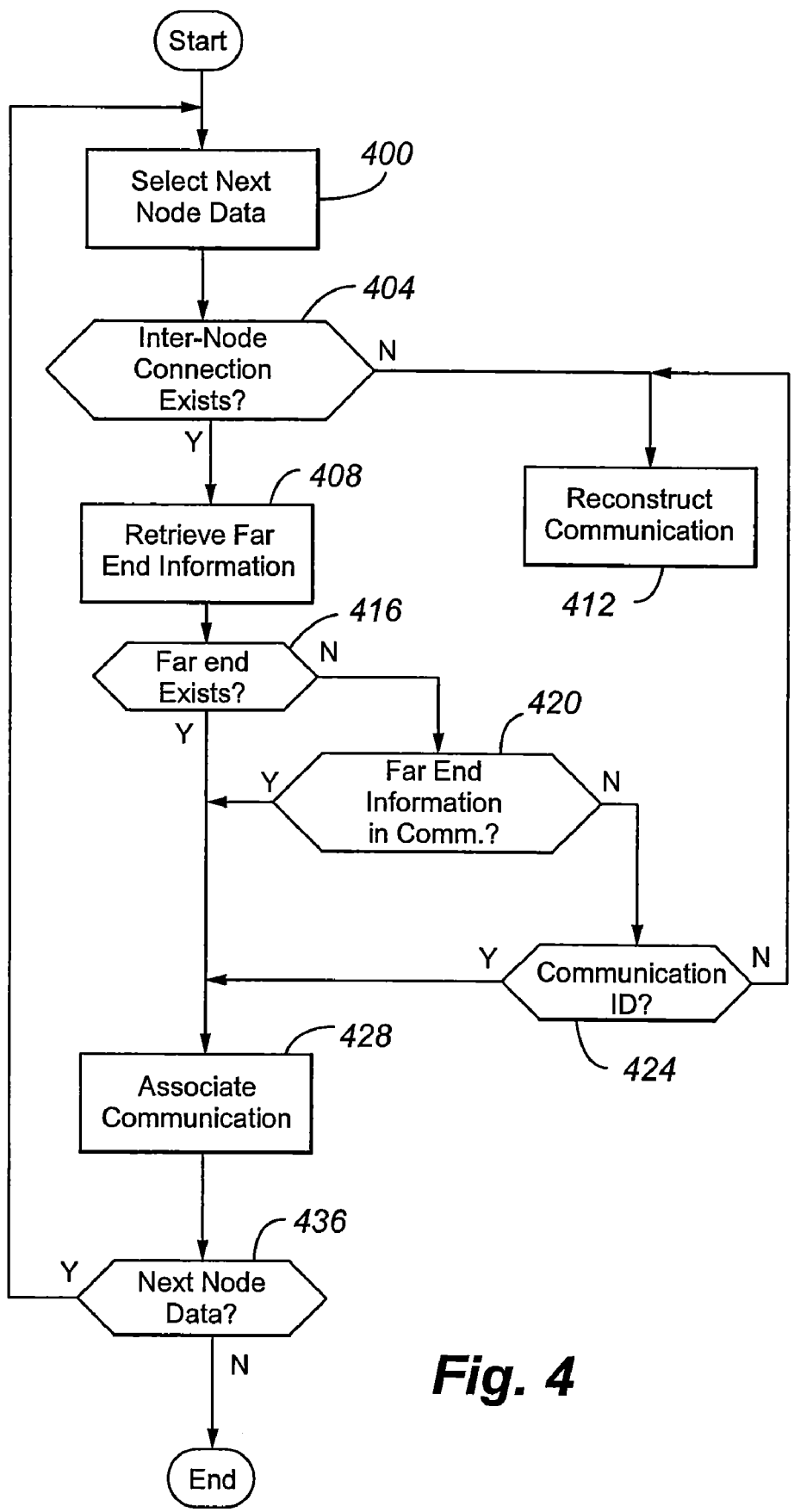
FIG. 4 is a flowchart depicting an iterative algorithm for populating a communication map according to an embodiment of the present invention.

With reference to FIG. 3, in step 300 a node will detect a failure of a signaling link with the primary communication server 212. It then attempts to register with the secondary communication server 216.

In step 304, the node registers with the secondary communication server 304. The communication server 304 determines, based on the type of registration and identification of the primary server 212, that the node has failed over with active call state information.

In step 308, the secondary communication server 304 retrieves connection state and termination property information. For example, this can be done using the H.248 audit mechanism known to those skilled in the art.

In step 312, the agent 228 uses the retrieved information to construct a temporary communication map, such as a temporary connection or context map. The termination property information is saved with each termination in the map. After the temporary map is constructed, the agent 228 sweeps through the map and discards unstable connections and corresponding terminations.

In step 316, which is discussed in detail below with reference to FIG. 4, the agent 228 populates the map to reconstruct the primary communication server's records. In a preferred configuration, the agent 228 processes the filtered temporary communication map, one context at a time, to reconstruct the connection records. Once the connection records and user state of the terminations with preserved connections are in place, call records are reconstructed.

Step 316 will now be described in greater detail with reference to FIG. 4. FIG. 4 assumes that the various node and communication identifiers have been or are being received at different times from the nodes impacted by the failure.

To illustrate the operation of the agent 228, two examples will be considered in which the first, second, and third nodes are gateways. In a first example, a communication spans the first and second communication nodes or an inter-gateway connection exists between the two nodes. In this example, the first node identifier is related to a representation of the communication maintained by the second communication node, and the second node identifier to a representation of the communication maintained by the first communication node. In a second example, a communication spans the first, second, and third communication nodes or an inter-gateway connection exists between the first and second nodes and between the second and third nodes. In this example, the first node identifier is related to representation of the communication maintained by the second communication node; the second node identifier to different representations of the communication maintained by each of the first and third communication nodes; and the third node identifier to a representation of the communication maintained by the first communication node. Since gateways migrate to a secondary server one at a time, the node and communication identifiers move to the secondary communication at different times. In the examples, the nodes fail over to the secondary server as follows: the first node precedes the second and third nodes and the third node precedes the second node.

In step 400, the agent 228 selects and reads a next node data for processing. In the examples, the next node data is next communication information maintained by the first node (which is the first node to migrate over) for a selected communication that includes the first node and communication identifiers associated with that communication.

In decision diamond 404, the agent 228 determines whether an inter-node connection exists. When no inter-node connection exists, the agent 228 reconstructs the communication normally. When, as in both examples, an inter-node connection exists, the agent 228 retrieves the far end information, or first node identifier, in step 408 and proceeds to decision diamond 416.

In decision diamond 408, the agent 228 determines whether a far end or node identifier exists (or whether the node associated with the identifier has already migrated to the secondary communication server 216 and has corresponding data structures already created). In one configuration, the agent 228 searches for an unmerged inter-node connection (INC) termination that matches the information contained in the first node identifier. The agent 228 searches among the unmerged terminations belonging to the first communication node for a match in a communication already received from another communication node. In the first example, no such communication information exists as the second and third communication nodes 204b and c have not yet registered with the secondary communication server 216. In the first example, when the second communication node 204b migrates to the secondary communication server 216, the answer is "yes" as the second node identifier is associated with the previously migrated first communication node. In the second example, when the third communication node 204c migrates to the server 216, the answer is "no" (as the third node identifier is associated with the as yet-unmigrated second communication node), and, when the second communication node 204b migrates to the server 216, the answer is "yes" (as the second node identifier is associated the previously migrated first and third nodes). In other words, the first node identifier causes the existence of the second (in the first and second examples) and not the third (in the second example) node to be flagged to indicate that it has not yet migrated to the secondary communication server.

When the far end or node identifier is in the map, the agent 228 in step 428 associates the selected communication information with the selected communication in the communication map 232.

When the far end or node identifier does not yet exist, the agent 228 in decision diamond 420 determines whether the far end information is flagged in the communication information associated with already migrated communication nodes. In other words, the agent 228 determines if the selected node identifier and any existing unmerged (INC) terminations belong to the same far end communication node and associated communication information. The agent 228 searches for an unmerged INC termination among all terminations such that the unmerged INC termination's far end communication node is the same as the selected node identifier's far end node. In the second example, when the third communication node 204c migrates to the server 216, the agent 228 searches for an unmerged termination among all of the terminations in all of nodes previously migrated to the secondary server, including in the first node's communication information, such that the unmerged termination's far end node matches the node identified in the third node identifier. Because the first node identifier matches the third node identifier (each of which are associated with the second communication node) a match is found.

When the unmerged termination's far end node matches the node identified in the selected node identifier, the agent 228 proceeds to step 428.

When the unmerged termination's far end node fails to match the node identified in the selected node identifier, the agent 228 proceeds to optional decision diamond 424.

In optional decision diamond 424, the agent 228 determines whether the selected communication information includes a communication identifier. The communication identifier permits the association of communication information with a communication even where an identified far end node is more than one hop away from the currently migrating node. When the communication identifier is present in the map 232, the agent 228 proceeds to step 428. When the communication identifier is not present in the map 232, the agent 228 proceeds to step 412.

After step 428, the agent 228 determines whether next communication data from the instant node has been received. If so, the agent returns to step 400. If not, the agent 228 terminates operation until data from another node arrives.

As will be appreciated, this algorithm is invoked as node node migrates over.

A number of variations and modifications of the invention can be used. It would be possible to provide for some features of the invention without providing others.

For example in one alternative embodiment, the node identifier or communication identifier can be used alone to effect communication reconstruction.

In another alternative embodiment, the reconstruction agent is embodied as a logic circuit, such as an Application Specific Integrated Circuit or ASIC or as a combination of software and a logic circuit.

In other embodiments, the invention is used with protocols other than SIP, H.248, and H.323, such as MGCP.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A first media gateway, comprising:
a first communication information comprising:
a first node identifier identifying a second media gateway, the first and second media gateways handling a common communication, the common communication involving an inter gateway connection between the first and second media gateways, the common communication involving a primary communication server, and the first node identifier being further associated with the common communication;
a communication identifier identifying the first node identifier and the common communication, wherein the common communication is between a communication device in communication with the first media gateway and a second communication device in communication with the second media gateway;
connection state information;
termination property information;
wherein the first communication information is sent to a second communication server to reestablish the common communication with the second communication device if the second media gateway fails, wherein reestablishing the common communication further comprises:
retrieving the connection state and the termination property information;
constructing a temporary communication map;
saving termination property information with each termination in the map; and
a reconstruction agent populating the temporary communication map to reconstruct the records for the primary communication server.

2. The gateway of claim 1, wherein the first node identifier is at least one of an electronic address of the second gateway, an identifier of a data structure in the second gateway, and an identifier of at least one resource of the second gateway and wherein the data structure and at least one resource are associated with the common communication.

3. The gateway of claim 2, wherein the first node identifier comprises an resource identifier associated with a second ephemeral termination involved in the common communication and a context identifier associated with second context involved in the common communication and wherein the second ephemeral termination and second context are each stored in the second gateway.

4. The gateway of claim 3, wherein the first node identifier is saved by the first gateway as a property of a first context stored by the first gateway, the first and second context each being associated with the common communication.

5. The gateway of claim 1, wherein the first node identifier is transmitted to a backup server when the first media gateway determines that a primary server has failed.

6. The gateway of claim 5, wherein the second gateway is operable to transmit a node identifier associated with the first media gateway to the backup server after the first media gateway has transmitted the first node identifier.

7. The gateway of claim 1, further comprising a communication identifier that identifies a selected communication uniquely among a defined group of communications.

8. The gateway of claim 7, wherein the communication identifier comprises at least one of a session identifier, a session key, and a random variable generated to describe the common communication.

9. In a communication network including a first media gateway and second media gateway handling a common communication that involves an inter gateway connection between the first and second media gateways, wherein the common communication is controlled by a first communication server, a method, comprising:
the first media gateway maintaining first communication information, first communication information comprising:
a first node identifier identifying the second media gateway and the common communication, the common communication involving an inter gateway connection between the first and second media gateways;
a communication identifier identifying the first node identifier and the common communication, wherein the common communication is between a communication device in communication with the first media gateway and a second communication device in communication with the second media gateway;
the first media gateway determining that the first communication server is unable to continue controlling the common communication; and
the first media gateway transmitting the first communication information to a second communication server to reestablish the common communication between the first communication device and the second communication device, wherein reestablishing the common communication further comprises:
retrieving the connection state and the termination property information;
constructing a temporary communication map;
saving termination property information with each termination in the map; and
a reconstruction agent populating the temporary communication map to reconstruct the records for the first communication server.

10. The method of claim 9, wherein the second communication server is a backup server to the first communication server.

11. The method of claim 9, wherein the first media gateway determines that the first communication server is unable to continue controlling the common communication by detecting a failure in a signaling channel with the first server.

12. The method of claim 9, further comprising:
the second media gateway maintaining a second node identifier associated with the first media gateway and the common communication;
the second media gateway determining that the first communication server is unable to continue controlling the common communication; and
the second media gateway transmitting the second node identifier to the second communication server.

13. The method of claim 12, wherein the second media gateway transmits the second node identifier to the second communication server after the first media gateway transmits the first node identifier to the second communication server.

14. The method of claim 9, wherein the first node identifier is at least one of an electronic address of the second media gateway, an identifier of a data structure in the second media gateway, and an identifier of at least one resource of the second media gateway and wherein the data structure and at least one resource are associated with the common communication.

15. The method of claim 14, wherein the first node identifier comprises an resource identifier associated with a second ephemeral termination involved in the common communication and a context identifier associated with second context involved in the common communication and wherein the second ephemeral termination and second context are each stored in the second media gateway.

16. The method of claim 15, wherein the first node identifier is saved by the first media gateway as a property of a first context stored by the first media gateway, the first and second context each being associated with the common communication.

17. The method of claim 9, further comprising:
wherein the communication identifier that identifies a selected communication uniquely among a defined group of communications.

18. The method of claim 17, wherein the communication identifier is transmitted to the second communication server along with the first node identifier.

19. The method of claim 9, wherein the first media gateway and second media gateway each comprise a common communication identifier, and wherein the second media gateway maintains a second node identifier that is different from the first node identifier.

20. A computer readable medium comprising processor executable instructions operable to perform the steps of claim 9.

* * * * *